US006187387B1

(12) United States Patent
Bolle et al.

(10) Patent No.: US 6,187,387 B1
(45) Date of Patent: Feb. 13, 2001

(54) STABILIZATION OF WOOD SUBSTRATES

(75) Inventors: Thomas Bolle, Efringen-Kirchen (DE); Jean-Pierre Wolf, Maisprach (CH); Raymond Seltzer, New City, NY (US)

(73) Assignee: Ciba Specialty Chemicals Corporation, Tarrytown, NY (US)

( * ) Notice: Under 35 U.S.C. 154(b), the term of this patent shall be extended for 0 days.

(21) Appl. No.: 09/267,472

(22) Filed: Mar. 11, 1999

(30) Foreign Application Priority Data

Mar. 19, 1998 (EP) ................................................. 98810238

(51) Int. Cl.$^7$ ....................................................... B05D 7/08
(52) U.S. Cl. .......................... 427/408; 427/160; 427/393
(58) Field of Search ................................... 427/160, 408, 427/393, 440

(56) References Cited

U.S. PATENT DOCUMENTS

| | | | |
|---|---|---|---|
| 3,993,655 | * 11/1976 | Rasberger et al. | 260/293.64 |
| 4,123,418 | * 10/1978 | Gilg et al. | 260/45.8 NT |
| 4,831,134 | 5/1989 | Winter et al. | 540/524 |
| 5,171,328 | 12/1992 | Trauth et al. | 8/402 |
| 5,610,211 | * 3/1997 | Borzatta et al. | 524/100 |
| 5,736,597 | * 4/1998 | Birbaum et al. | 524/100 |
| 6,020,406 | * 2/2000 | Gugumus | 524/95 |

FOREIGN PATENT DOCUMENTS 0434608    6/1991 (EP) .

OTHER PUBLICATIONS

English Language Abstract CA, 126: 344603 of A. Castellan, et al., Cellul. Chem. Technol., 30(5–6), 431 (1996).
Journal of Polymer Science: Polymer Chemistry Edition, vol. 22, pp 277–281 (1984).
Derwent Abstr. 84–203744/33.

* cited by examiner

Primary Examiner—Shrive Beck
Assistant Examiner—Jennifer Kolb
(74) Attorney, Agent, or Firm—Luther A. R. Hall

(57) ABSTRACT

The invention relates to a method of protecting wood against light-induced degradation by treatment with
a stain or impregnation which penetrates the surface of the wood comprising
a) at least one organic solvent;
b) a hindered amine compound of formula I or II

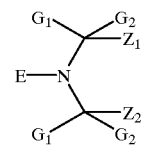

(I)

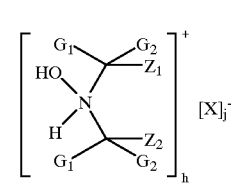

(II)

where
$G_1$ and $G_2$ are independently alkyl of 1 to 4 carbon atoms or are together pentamethylene,
$Z_1$ and $Z_2$ are each methyl, or $Z_1$ and $Z_2$ together form a linking moiety which may additionally be substituted by an ester, ether, hydroxy, oxo, cyanohydrin, amide, amino, carboxy or urethane group,
E is oxyl or hydroxyl,
X is an inorganic or organic anion, and
where the total charge of cations h is equal to the total charge of anions j.

7 Claims, No Drawings

STABILIZATION OF WOOD SUBSTRATES

The invention relates to a method of stabilizing wood with a sterically hindered amine N-oxyl or N-hydroxyl against damage by heat and light and to the use of a sterically hindered amine N-oxyl or N-hydroxyl for the stabilization of wood.

Surfaces of wood which are exposed to intense sunlight are damaged primarily by the UV component of sunlight. This process is even enhanced by heat due to the absorbed infrared radiation from the sun. The polymeric constituents of the wood are degraded, leading to a roughening and discoloration of the surface. Subsequently, further damage results from infestation by microorganisms, especially by fungi.

The usual method of protecting wood against damage by light without giving up the visual image of the wood surface is to coat it with a colourless varnish containing a light stabilizer, in particular a UV absorber.

The addition of phenolic antioxidants to wood varnishes is also known. For example, U.S. Pat. No. 3,285,855 discloses the color stabilization of furniture varnishes based on acid-curable urea/formaldehyde alkyd resins by adding 0.2% by weight of a phenolic antioxidant. Wood protective coatings which contain a UV absorber, an antioxidant and an insecticide are disclosed for example in JP-A-59/115 805.

EP-A-0 479 075 discloses sterically hindered amine stabilizers for wood stains which are substituted at the Nitrogen atom by hydrogen, alkyl, allyl, hydroxymethyl, hydroxyethyl, acyl, benzoyl or benzyl.

It has now been found that sterically hindered amine N-oxyls or N-hydroxyls have a marked stabilizing activity against light-induced degradation if they are applied in a stain or impregnation which penetrates the wood. The wood may then additionally provided with a top coat, which top coat may contain other conventional light stabilizers.

The present invention provides superior weatherability to wood substrates as compared to prior art techniques. It is for example possible to leave it without additional coating or to apply only a very thin or transparent coating to the thus impregnated wood. This is in many cases desirable for aesthetical reasons.

Wood is a complex polymeric material containing essentially cellulose, hemicellulose and lignin. Lignin itself is a complex mixture of high molecular weight products which are derived from conyferyl alcohol.

Particularly lignin causes discoloration and undergoes degradation upon exposure to actinic radiation. It is therefore also an object of the present invention to prevent the photochemical degradation of the lignin part of wood. In addition, preventing lignin breakdown may remove a source of nutrition for fungi and thus reduce or prevent fungal attack. Therefore reduced amounts or essentially no biocides may be used in some cases.

Accordingly, the invention relates to a method of protecting wood against light-induced degradation by treatment with a stain or impregnation which penetrates the surface of the wood comprising a) at least one organic solvent and b) a hindered amine compound of formula I or II

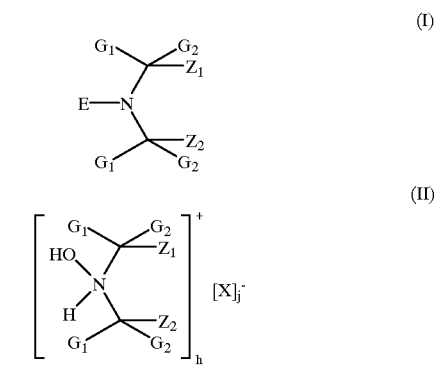

where $G_1$ and $G_2$ are independently alkyl of 1 to 4 carbon atoms or are together pentamethylene, $Z_1$ and $Z_2$ are each methyl, or $Z_1$ and $Z_2$ together form a linking moiety which may additionally be substituted by an ester, ether, hydroxy, oxo, cyanohydrin, amide, amino, carboxy or urethane group, E is oxyl or hydroxyl, X is an inorganic or organic anion, and where the total charge of cations h is equal to the total charge of anions j.

Preferred is a method where in the compound of component (b), E is oxyl or hydroxyl; and $Z_1$ and $Z_2$ are each methyl or together are a hydrocarbon linking moiety containing 1–200 carbon atoms and 0–60 heteroatoms selected from oxygen atoms and nitrogen atoms.

Examples for X include X as phosphate, carbonate, bicarbonate, nitrate, chloride, bromide, bisulfite, sulfite, bisulfate, sulfate, borate, carboxylate, an alkylsulfonate or an arylsulfonate, or a phosphonate, like, for example, diethylenetriaminepentamethylenephosphonate. X as carboxylate especially is a carboxylate of a mono-, di-, tri- or tetracarboxylic acid, mainly of 1–18 carbon atoms, such as a formate, acetate, benzoate, citrate, oxalate, tartrate, acrylate, polyacrylate, fumarate, maleate, itaconate, glycolate, gluconate, malate, mandelate, tiglate, ascorbate, polymethacrylate, or of nitrilotriacetic acid, hydroxyethylethylenediaminetriacetic acid, ethylenediaminetetraacetic acid or diethylenetriaminepentaacetic acid.

Also preferred is a method where in the compound of component (b), X is phosphate, carbonate, bicarbonate, nitrate, chloride, bromide, bisulfite, sulfite, bisulfate, sulfate, borate, carboxylate, an alkylsulfonate or an arylsulfonate, or a phosphonate.

Most preferably, X is chloride, bisulfite, bisulfate, sulfate, phosphate, nitrate, ascorbate, acetate, citrate or carboxylate of ethylenediaminetetraacetic acid or of diethylenetriaminepentaacetic acid; most especially wherein X is bisulfate or citrate.

h and j are preferably from the range 1–5.

Preferably, $Z_1$ and $Z_2$ as a linking moiety are a chain of 2 or 3 carbon atoms or 1 or 2 carbon atoms and a nitrogen or oxygen atom forming together with the remaining structure in formula I or II a saturated 5- or 6-membered heterocyclic ring, which may be substituted as mentioned. The substituents in $Z_1$ and $Z_2$ themselves may contain hindered amine moieties. Preferred are compounds of the formula I or II containing 1–4, especially 1 or 2 hindered amine or hindered ammonium moieties. Preferably, $Z_1$ and $Z_2$ as a linking moiety is a hydrocarbon containing 1–200, especially 1–60 carbon atoms and 0–60, especially 0–30 heteroatoms selected from oxygen atoms and nitrogen atoms.

Any group denoted as aryl mainly means $C_6$–$C_{12}$aryl, preferably phenyl or naphthyl, especially phenyl.

The compounds of component (b) of the invention can be pure or mixtures of compounds.

Groups denoted as alkyl are, within the definitions given, mainly $C_1$–$C_{18}$alkyl, for example methyl, ethyl, propyl such as n- or isopropyl, butyl such as n-, iso-, sec- and tert-butyl, pentyl, hexyl, heptyl, octyl, nonyl, decyl, undecyl, dodecyl, tridecyl, tetradecyl, pentadecyl, hexadecyl, heptadecyl or octadecyl.

Groups denoted as alkylene are, within the definitions given, for example methylene, 1,2-ethylene, 1,1-ethylene, 1,3-propylene, 1,2-propylene, 1,1-propylene, 2,2-propylene, 1,4-butylene, 1,3-butylene, 1,2-butylene, 1,1-butylene, 2,2-butylene, 2,3-butylene, or —$C_5H_{10}$—, —$C_6H_{12}$—, $C_7H_{14}$, —$C_8H_{16}$—, —$C_9H_{18}$—, —$C_{10}H_{20}$—, —$C_{11}H_{22}$—, —$C_{12}H_{24}$—, —$C_{13}H_{26}$—, —$C_{14}H_{28}$—, —$C_{15}H_{30}$—, —$C_{16}H_{32}$—, —$C_{17}H_{34}$—, —$C_{18}H_{36}$—.

Groups denoted as cycloalkyl or cycloalkoxy are mainly $C_5$–$C_{12}$cycloalkyl or $C_5$–$C_{12}$cycloalkoxy, the cycloalkyl part being, for example, cyclopentyl, cyclohexyl, cycloheptyl, cyclooctyl, cyclononyl, cyclodecyl, cycloundecyl or cyclododecyl. Cycloalkenyl is mainly $C_5$–$C_{12}$cycloalkenyl including cyclopentenyl, cyclohexenyl, cycloheptenyl, cyclooctenyl, cyclononenyl, cyclodecenyl, cycloundecenyl, cyclododecenyl.

Aralkyl or aralkoxy is preferably phenylalkyl or phenylalkoxy, which is alkyl or alkoxy substituted by phenyl. Examples for phenylalkyl or phenylalkoxy are, within the definitions given, benzyl, benzyloxy, a-methylbenzyl, a-methylbenzyloxy, cumyl, cumyloxy.

Residues alkenyl are mainly alkenyl of 2 to 18 carbon atoms, most preferably allyl.

Residues alkynyl are mainly alkynyl of 2 to 12 carbon atoms, preferred is propargyl.

A group denoted as acyl is mainly R(C=O)—, where R is an aliphatic or aromatic moiety.

An aliphatic or aromatic moiety, such as mentioned above or in other definitions, mainly is an aliphatic or aromatic $C_1$–$C_{30}$hydrocarbon; examples are aryl, alkyl, cycloalkyl, alkenyl, cycloalkenyl, bicycloalkyl, bicycloalkenyl, and combinations of these groups.

Examples for acyl groups are alkanoyl of 2 to 12 carbon atoms, alkenoyl of 3 to 12 carbon atoms, benzoyl.

Alkanoyl embraces, for example, formyl, acetyl, propionyl, butyryl, pentanoyl, octanoyl; preferred is $C_2$–$C_8$alkanoyl, especially acetyl.

Residues alkenoyl are most preferably acryloyl or methacryloyl.

The alkyl groups in the different substituents may be linear or branched.

Examples for alkyl of 1 to 6 carbon atoms are methyl ethyl propyl and its isomers, butyl and its isomers pentyl and its isomers and hexyl and its isomers.

Examples for alkenyl groups with 2 to 4 carbon atoms are ethenyl, propenyl, butenyl.

Examples for alkyl groups with 1 to 4 carbon atoms interrupted by one or two oxygen atoms are —$CH_2$—O—$CH_3$, —$CH_2$—$CH_2$—O—$CH_3$, —$CH_2$—$CH_2$—O—$CH_2$—$CH_3$, —$CH_2$—O—$CH_2$—$CH_2$—O—$CH_3$ or —$CH_2$—O—$CH_2$—O—$CH_3$.

Examples for hydroxy substituted alkyl groups with 2 to 6 carbon atoms are hydroxy ethyl, di-hydroxy ethyl, hydroxy propyl, di-hydroxy propyl, hydroxy butyl, hydroxy pentyl or hydroxy hexyl.

A preferred composition contains a compound of component (b), where E is oxyl or hydroxyl and X is chloride, bisulfate, sulfate, formate, acetate, benzoate, oxalate, citrate, a carboxylate of ethylenediaminetetraacetic acid or of diethylenetriaminepentaacetic acid or polyacrylate.

More preferred is a composition where in the compound of component (b), E is oxyl or hydroxyl and X is citrate.

Preferably the compound of component b) is selected from the compounds of formulas A to EE and A* to EE* and III to IIIc

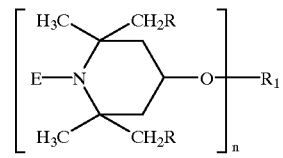
(A)

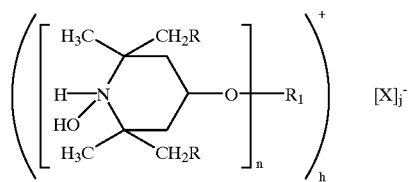
(A*)

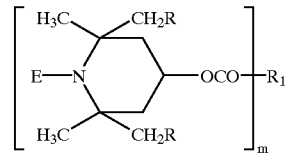
(B)

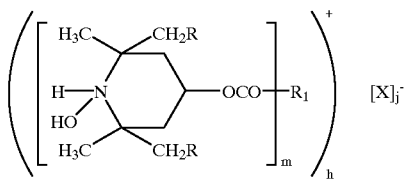
(B*)

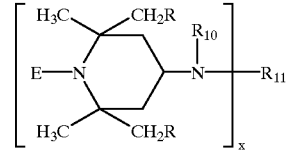
(C)

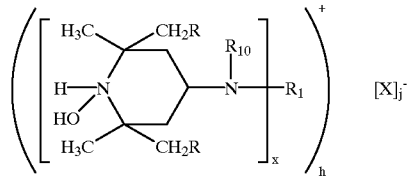
(C*)

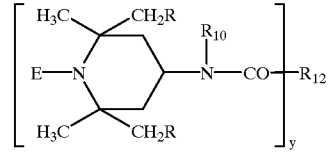
(D)

-continued
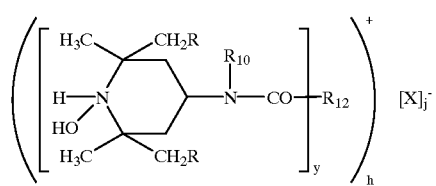 (D*)
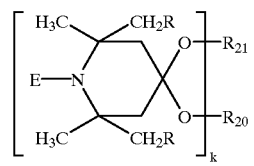 (E)
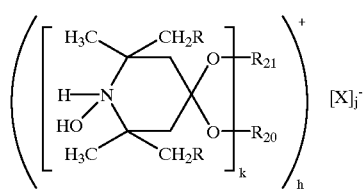 (E*)
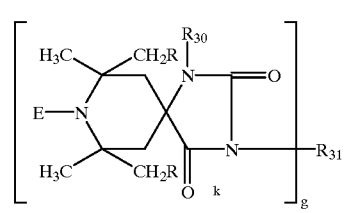 (F)
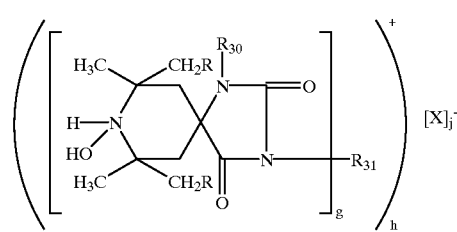 (F*)
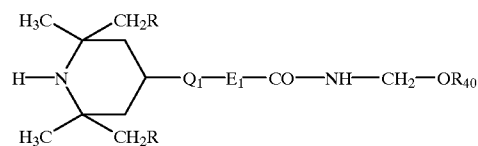 (G)
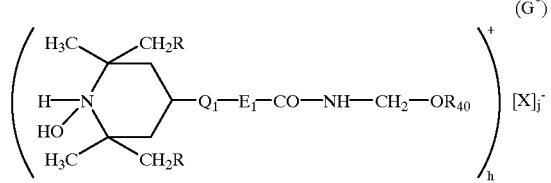 (G*)
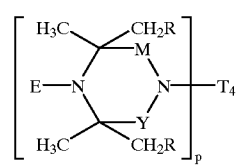 (H)
-continued
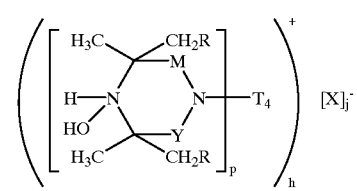 (H*)
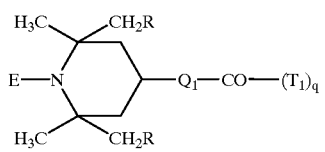 (I)
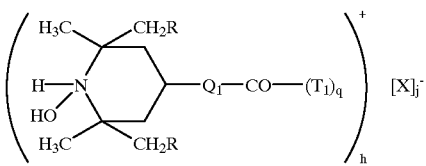 (I*)
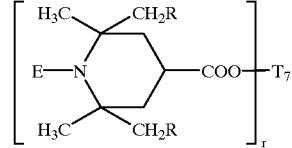 (J)
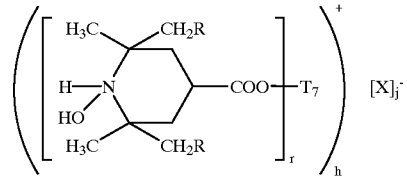 (J*)
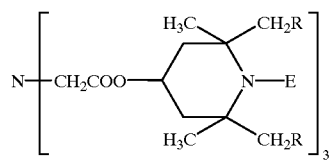 (K)
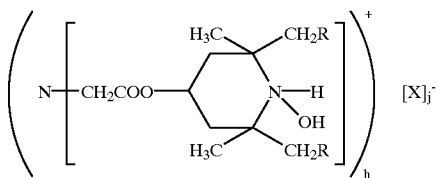 (K*)
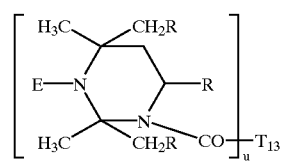 (L)

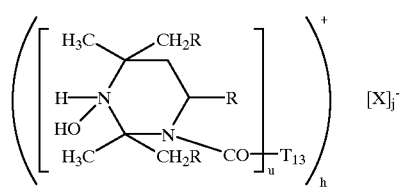 (L*)
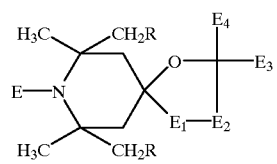 (M)
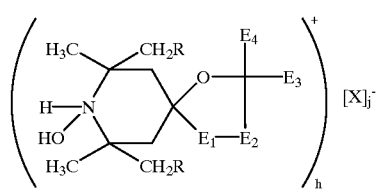 (M*)
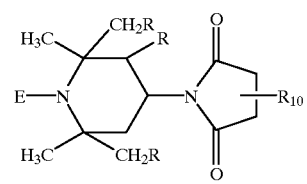 (O)
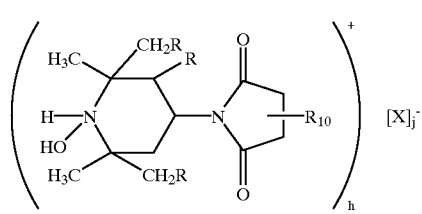 (O*)
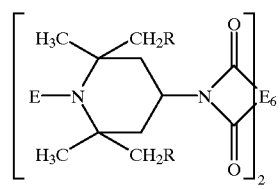 (P)
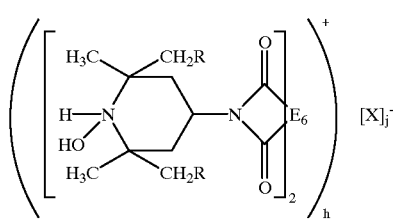 (P*)
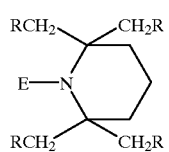 (Q)
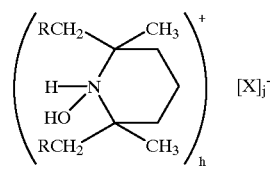 (Q*)
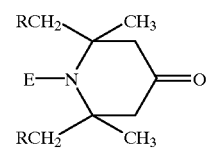 (R)
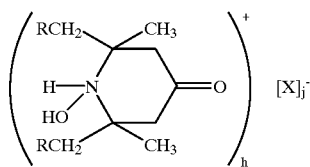 (R*)
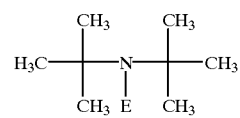 (S)
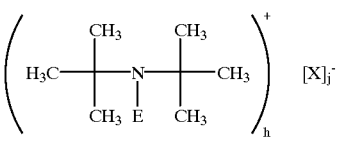 (S*)
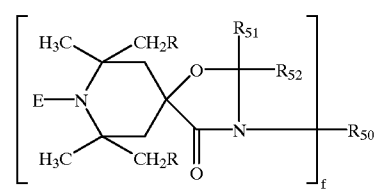 (T)
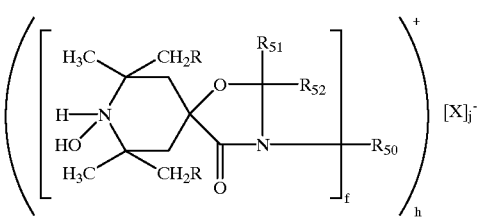 (T*)
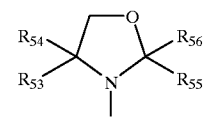 (U)
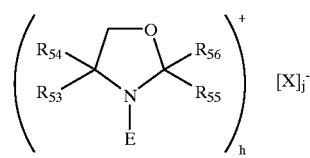 (U*)

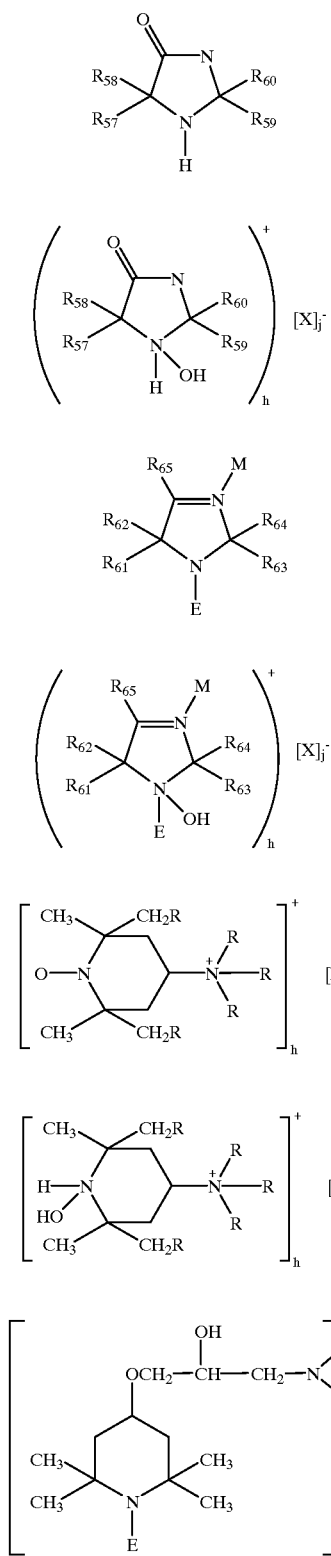
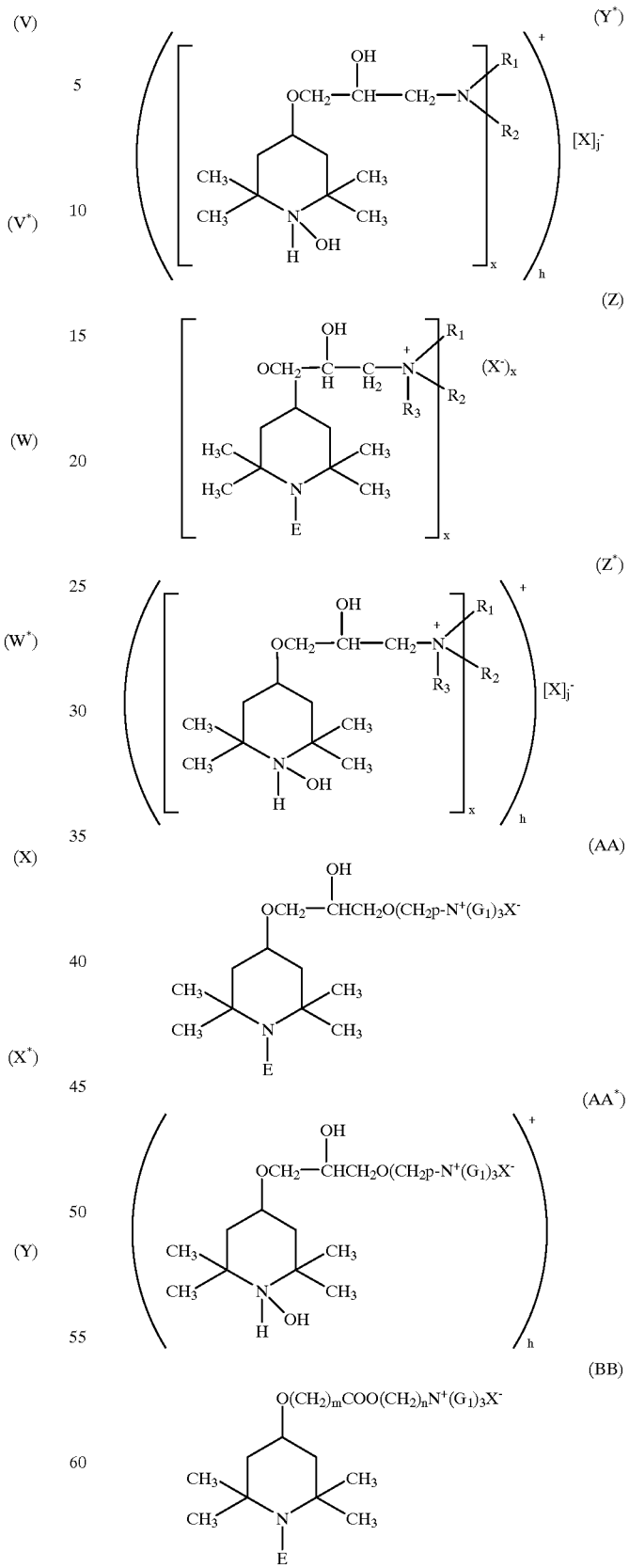

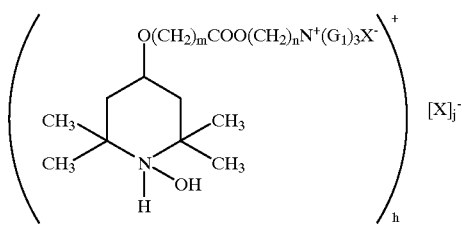 (BB*)

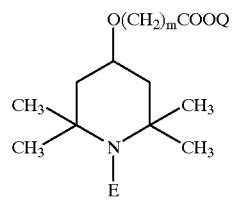

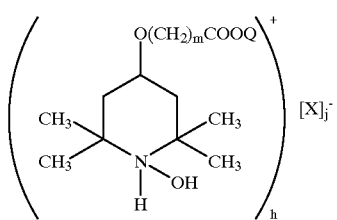 (CC*)

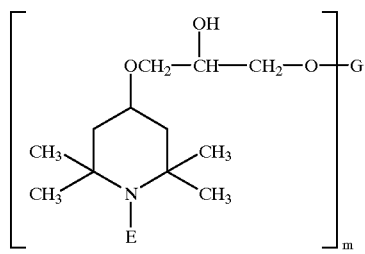 (DD)

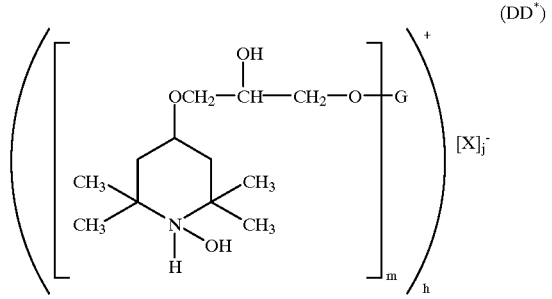 (DD*)

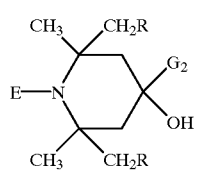 (EE)

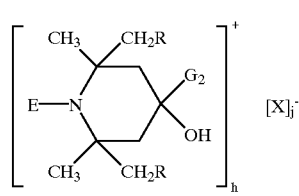 (EE*)

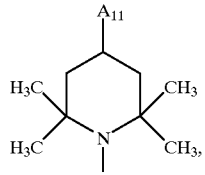 (III)

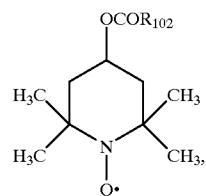 (IIIa)

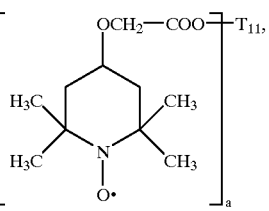 (IIIb)

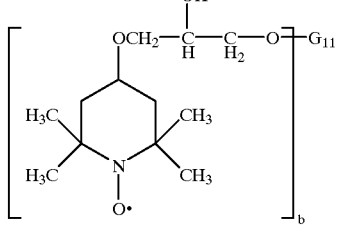 (IIIc)

wherein
E is oxyl or hydroxyl,
R is hydrogen or methyl,
in formula A and A*,
n is 1 or 2,
when n is 1,
$R_1$ is hydrogen, alkyl of 1 to 18 carbon atoms, alkenyl of 2–18 carbon atoms, propargyl, glycidyl, alkyl of 2 to 50 carbon atoms interrupted by one to twenty oxygen atoms, said alkyl substituted by one to ten hydroxyl groups or both interrupted by said oxygen atoms and substituted by said hydroxyl groups, or
$R_1$ is alkyl of 1 to 4 carbon atoms substituted by a carboxy group or by —COOZ where Z is hydrogen, alkyl of 1 to 4 carbon atoms or phenyl, or where Z is said alkyl substituted by —(COO$^-$)$_n$ M$^{n+}$ where n is 1–3 and M is a metal ion from the 1st, 2nd or 3rd group of the periodic table or is Zn, Cu, Ni or Co, or M is a group N$^{n+}$ (R$_2$)$_4$ where $R_2$ is alkyl of 1 to 8 carbon atoms or benzyl,
when n is 2,
$R_1$ is alkylene of 1 to 12 carbon atoms, alkenylene of 4 to 12 carbon atoms, xylylene or alkylene of 1 to 50 carbon atoms interrupted by one to twenty oxygen atoms, substituted by one to ten hydroxyl groups or both interrupted by said oxygen atoms and substituted by said hydroxyl groups, in formula B and B*, m is 1 to 4, when m is 1, $R_2$ is alkyl of 1 to 18 carbon atoms, alkyl of 3 to 18 carbon atoms interrupted by —COO—, alkyl of 3 to 18 carbon atoms substituted by COOH or COO—, or $R_2$ is —$CH_2(OCH_2CH_2)_nOCH_3$ where n is 1 to 12, or $R_2$ is cycloalkyl of 5 to 12 carbon atoms, aryl of 6 to 12 carbon atoms, or said aryl substituted by one to four alkyl groups of 1 to 4 carbon atoms, or $R_2$ is —$NHR_3$ where $R_3$ is alkyl of 1 to 18 carbon atoms, cycloalkyl of 5 to 12 carbon atoms, aryl of 6 to 12 carbon atoms, or said aryl substituted by one to four alkyl of 1 to 4 carbon atoms, or $R_2$ is —$N(R_3)_2$ where $R_3$ is as defined above, when m is 2, $R_2$ is alkylene of 1 to 12 carbon atoms, alkenylene of 4 to 12 carbon atoms, xylylene, alkylene of 2 to 12 carbon atoms interrupted by —COO—, alkylene of 3 to 18 carbon atoms substituted by COOH or COO—, or $R_2$ is —$CH_2(OCH_2CH_2)_nOCH_2$— where n is 1 to 12, or $R_2$ is cycloalkylene of 5 to 12 carbon atoms, aralkylene of 7 to 15 carbon atoms or arylene of 6 to 12 carbon atoms, or $R_2$ is —$NHR_4NH$— where $R_4$ is alkylene of 2 to 18 carbon atoms, cycloalkylene of 5 to 12 carbon atoms, aralkylene of 8 to 15 carbon atoms or arylene of 6 to 12 carbon atoms, or $R_2$ is —$N(R_3)R_4N(R_3)$— where $R_3$ and $R_4$ are as defined above, or $R_2$ is —CO— or —NH—CO—NH—, when m is 3, $R_2$ is alkanetriyl of 3 to 8 carbon atoms or benzenetriyl, or when m is 4, $R_2$ is alkanetetrayl of 5 to 8 carbon atoms or benzenetetrayl, in formula C and C*, $R_{10}$ is hydrogen, alkyl of 1 to 18 carbon atoms, cycloalkyl of 5 to 12 carbon atoms, aralkyl of 7 to 15 carbon atoms, alkanoyl of 2 to 18 carbon atoms, alkenoyl of 3 to 5 carbon atoms or benzoyl, x is 1 or 2, when x is 1, $R_{11}$ is hydrogen, alkyl of 1 to 18 carbon atoms, alkenyl of 2 to 18 carbon atoms, propargyl, glycidyl, alkyl of 2 to 50 carbon atoms interrupted by one to twenty oxygen atoms, said alkyl substituted by one to ten hydroxyl groups or both interrupted by said oxygen atoms and substituted by said hydroxyl groups, or $R_{11}$ is alkyl of 1 to 4 carbon atoms substituted by a carboxy group or by —COOZ where Z is hydrogen, alkyl of 1 to 4 carbon atoms or phenyl, or where Z is said alkyl substituted by—$(COO^-)_nM^{n+}$ where n is 1–3 and M is a metal ion from the 1st, 2nd or 3rd group of the periodic table or is Zn, Cu, Ni or Co, or M is a group $N^{n+}(R_2)_4$ where $R_2$ is hydrogen, alkyl of 1 to 8 carbon atoms or benzyl, or when x is 2, $R_{11}$, is alkylene of 1 to 12 carbon atoms, alkenylene of 4 to 12 carbon atoms, xylylene or alkylene of 1 to 50 carbon atoms interrupted by one to twenty oxygen atoms, substituted by one to ten hydroxyl groups or both interrupted by said oxygen atoms and substituted by said hydroxyl groups, in formula D and D*, $R_{10}$ is as defined above, y is 1 to 4, and $R_{12}$ is defined as $R_2$ above, in formula E and E*, k is 1 or 2, when k is 1, $R_{20}$ and $R_{21}$ are independently alkyl of 1 to 12 carbon atoms, alkenyl of 2 to 12 carbon atoms or aralkyl of 7 to 15 carbon atoms, or $R_{20}$ is also hydrogen, or $R_{20}$ and $R_{21}$ together are alkylene of 2 to 8 carbon atoms or said alkylene substituted by hydroxyl, or are acyloxy-alkylene of 4 to 22 carbon atoms, or when k is 2, $R_{20}$ and $R_{21}$, are together (—$CH_2)_2C(CH_2$—$)_2$, in formula F and F*, $R_{30}$ is hydrogen, alkyl of 1 to 18 carbon atoms, benzyl, glycidyl, or alkoxyalkyl of 2 to 6 carbon atoms, g is 1 or 2, when g is 1, $R_{31}$ is defined as $R_1$ above when n is 1, when g is 2, $R_{31}$ is defined as $R_1$ above when n is 2, in formula G and G*, $Q_1$ is —$NR_{41}$— or —O—, $E_1$ is alkylene of 1 to 3 carbon atoms, or $E_1$ is —$CH_2$—$CH(R_{42})$—O— where $R_{42}$ is hydrogen, methyl or phenyl, or $E_1$ is —$(CH_2)_3$—NH— or $E_1$ is a direct bond, $R_{40}$ is hydrogen or alkyl of 1 to 18 carbon atoms, $R_{41}$ is hydrogen, alkyl of 1 to 18 carbon atoms, cycloalkyl of 5 to 12 carbon atoms, aralkyl of 7 to 15 carbon atoms, aryl of 6 to 10 carbon atoms, or $R_{41}$ is —$CH_2$—$CH(R_{42})$—OH where $R_{42}$ is as defined above, in formula H and H*, p is 1 or 2, $T_4$ is as defined for $R_{11}$ when x is 1 or 2, M and Y are independently methylene or carbonyl, preferably M is methylene and Y is carbonyl, in formula I and I*, this formula denotes a recurring structural unit of a polymer where $T_1$ is ethylene or 1,2-propylene or is the repeating structural unit derived from an alpha-olefin copolymer with an alkyl acrylate or methacrylate, and where q is 2 to 100, $Q_1$ is —$N(R_{41})$— or —O— where $R_{41}$ is as defined above, in formula J and J*, r is 1 or 2, $T_7$ is as defined for $R_1$ when n is 1 or 2 in formula A, in formula L and L*, u is 1 or 2, $T_{13}$ is as defined for $R_1$ when n is 1 or 2 in formula A, with the proviso that $T_{13}$ is not hydrogen when u is 1, in formula M and M*, $E_1$ and $E_2$, being different, each are —CO— or —$N(E_5)$— where $E_5$ is hydrogen, alkyl of 1 to 12 carbon atoms or alkoxycarbonylalkyl of 4 to 22 carbon atoms, $E_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms, $E_4$ is hydrogen, alkyl of 1 to 30 carbon atoms, phenyl, naphthyl or phenylalkyl of 7 to 12 carbon atoms, or $E_3$ and $E_4$ together are polymethylene of 4 to 17 carbon atoms, or said polymethylene substituted by one to four alkyl of 1 to 4 carbon atoms, preferably methyl, in formula N and N*, $R_1$ is as defined for $R_1$ in formula A when n is 1, $G_3$ is a direct bond, alkylene of 1 to 12 carbon atoms, phenylene or —NH—$G_1$—NH— where $G_1$ is alkylene of 1 to 12 carbon atoms, in formula O and O*, $R_{10}$ is as defined for $R_{10}$ in formula C, in formula P and P*, $E_6$ is an aliphtic or aromatic tetravalent radical, preferably neopentanetetrayl or benzenetetrayl, in formula T and T*, $R_{51}$ is hydrogen, alkyl of 1 to 18 carbon atoms, cycloalkyl of 5 to 12 carbon atoms, or aryl of 6 to 10 carbon atoms, $R_{52}$ is hydrogen or alkyl of 1 to 18 carbon atoms, or $R_{51}$ and $R_{52}$ together of alkylene of 4 to 8 carbon atoms, f is 1 or 2, when f is 1, $R_{50}$ is as defined for $R_{11}$ in formula C when x is 1, or $R_{50}$ is —$(CH_2)_z COOR_{54}$ where z is 1 to 4 and $R_{54}$ is hydrogen or alkyl of 1 to 18 carbon atoms, or $R_{54}$ is a metal ion from the 1st, 2nd or 3rd group of the periodic table or a group —$N(R_{55})_4$ where $R_{55}$ is hydrogen, alkyl of 1 to 12 carbon atoms or benzyl, when f is 2, $R_{50}$ is as defined for $R_{11}$, in formula C when x is 2, in formula U and U*, $R_{53}$, $R_{54}$, $R_{55}$ and $R_{56}$ are independently alkyl of 1 to 4 carbon atoms or are together pentamethylene.

in formula V and V*, $R_{57}$, $R_{58}$, $R_{59}$ and $R_{60}$ are independently alkyl of 1 to 4 carbon atoms or are together pentamethylene.

in formula W and W*, $R_{61}$, $R_{62}$, $R_{63}$ and $R_{64}$ are independently alkyl of 1 to 4 carbon atoms or are together pentamethylene, $R_{65}$ is alkyl of 1 to 5 carbon atoms, M is hydrogen or oxygen, wherein in formulas X to CC and X* to CC* n is 2 to 3, $G_1$ is hydrogen, methyl, ethyl, butyl or benzyl, m is 1 to 4, x is 1 to 4, when x is 1, $R_1$ and $R_2$ are independently alkyl of 1 to 18 carbon atoms, said alkyl interrupted by one to five oxygen atoms, said alkyl substituted by 1 to 5 hydroxyl groups or said alkyl both interrupted by said oxygen atoms and substituted by said hydroxyl groups; cycloalkyl of 5 to 12 carbon atoms, aralkyl of 7 to 15 carbon atoms, aryl of 6 to 10 carbon atoms or said aryl substituted by one to three alkyl of 1 to 8 carbon atoms, or $R_1$ is also hydrogen, or $R_1$ and $R_2$ are together tetramethyl, pentamethylene, hexamethylene or 3-oxapentamethylene, when x is 2, $R_1$ is hydrogen, alkyl of 1 to 8 carbon atoms, said alkyl interrupted by one or two oxygen atoms, said alkyl substituted by a hydroxyl group, or said alkyl both interrupted by one or two oxygen atoms and substituted by a hydroxyl group, $R_2$ is alkylene of 2 to 18 carbon atoms, said alkylene interrupted by one to five oxygen atoms, said alkylene substituted by 1 to 5 hydroxyl groups or said alkylene both interrupted by said oxygen atoms and substituted by said hydroxyl groups; o-, m- or p-phenylene or said phenylene substituted by one or two alkyl of 1 to 4 carbon atoms, or $R_2$ is —$(CH_2)_k O[(CH_2)_k O]_h (CH_2)_k$— where k is 2 to 4 and h is 1 to 40, or $R_1$ and $R_2$ together with the two N atoms to which they are attached are piperazin-1,4-diyl, when x is 3, $R_1$ is hydrogen, $R_2$ is alkylene of 4 to 8 carbon atoms interrupted by one nitrogen atom, when x is 4, $R_1$ is hydrogen, $R_2$ is alkylene of 6 to 12 carbon atoms interrupted by two nitrogen atoms, $R_3$ is hydrogen, alkyl of 1 to 8 carbon atoms, said alkyl interrupted by one or two oxygen atoms, said alkyl substituted by a hydroxyl group, or both interrupted by one or two oxygen atoms and substituted by a hydroxyl group, p is 2 or 3, and Q is an alkali metal salt, ammonium or $N^+(G_1)_4$, and in formula DD and DD* m is 2 or 3, when m is 2, G is —$(CH_2 CHR—O)_r CH_2 CHR$—, where r is 0 to 3, and R is hydrogen or methyl, and when m is 3, G is glyceryl, in formula EE and EE*

$G_2$ is —CN, —$CONH_2$ or —$COOG_3$ where $G_3$ is hydrogen, alkyl of 1 to 18 carbon atoms or phenyl, X is an inorganic or organic anion, where the total charge of cations h is equal to the total charge of anions j; and wherein in formulas III to IIIc $A_{11}$ is $OR_{101}$ or $NR_{111}R_{112}$ $R_{101}$ is alkenyl of 2 to 4 carbon atoms, propargyl, glycidyl, alkyl of 2 to 6 carbon atoms interrupted by one or two oxygen atoms, substituted by one to three hydroxyl groups or both interrupted by said oxygen atoms and substituted by said hydroxyl groups, or $R_{101}$ is alkyl of 1 to 4 carbon atoms substituted by carboxy or by the alkali metal, ammonium or $C_1$–$C_4$alkylammonium salts thereof; or $R_{101}$ is alkyl substituted by —$COOE_{10}$ where $E_{10}$ is methyl or ethyl, $R_{102}$ is alkyl of 3 to 5 carbon atoms interrupted by —COO— or by —CO, or $R_{102}$ is —$CH_2 (OCH_2 CH_2)_c OCH_3$ where c is 1 to 4; or $R_{102}$ is —$NHR_{103}$ where $R_{103}$ is alkyl of 1 to 4 carbon atoms, a is 2 to 4, when a is 2, $T_{11}$ is —$(CH_2 CHR_{100}—O)_d CH_2 CHR_{100}$—, where d is 0 or 1, and $R_{100}$ is hydrogen or methyl, when a is 3, $T_{11}$ is glyceryl, when a is 4, $T_{11}$ is neopentanetetrayl, b is 2 or 3, when b is 2, $G_{11}$ is $-(CH_2CHR_{100}-O)_e$ $CH_2CHR_{100}-$, where e is 0 to 3, and $R_{100}$ is hydrogen or methyl, and when b is 3, $G_{11}$ is glyceryl;

$R_{111}$ is hydrogen, alkyl of 1 to 4 carbon atoms, or said alkyl substituted by one or two hydroxyl, interrupted by one or two oxygen atoms, or both substituted by one hydroxyl and interrupted by one or two oxygen atoms, $R_{112}$ is $-CO-R_{113}$ where $R_{113}$ has the same meaning as $R_{111}$, or $R_{113}$ is $-NHR_{114}$ wherein $R_{114}$ is alkyl of 1 to 4 carbon atoms, said alkyl substituted by one or two hydroxyl, substituted by alkoxy of 1 to 2 carbon atoms, or said alkyl both substituted by one hydroxyl and by one alkoxy of 1 to 2 carbon atoms, or $R_{111}$ and $R_{112}$ together are $-CO-CH_2CH_2-CO-$, $-CO-CH=CH-CO-$ or $-(CH_2)_6-CO-$; and with the proviso that, when $R_{113}$ is alkyl of 1 to 4 carbon atoms, $R_{111}$ is not hydrogen.

More preferably the compound of component (b) is selected from the compounds of formulas A, A*, B, B*, C, C*, D, D*, Q, Q*, R, R*, S or S*, X, X*, Y, Y*, Z and Z* where E is oxyl or hydroxyl, and R is hydrogen, in formula A and A* n is 1 or 2, when n is 1, $R_1$ is hydrogen, alkyl of 1 to 6 carbon atoms, alkenyl of 2–6 carbon atoms, propargyl, glycidyl, alkyl of 2 to 20 carbon atoms interrupted by one to ten oxygen atoms, said alkyl substituted by one to five hydroxyl groups or both interrupted by said oxygen atoms and substituted by said hydroxyl groups, or $R_1$ is alkyl of 1 to 4 carbon atoms substituted by a carboxy group or by $-COOZ$ where Z is hydrogen or alkyl of 1 to 4 carbon atoms, when n is 2, $R_1$ is alkylene of 1 to 8 carbon atoms, alkenylene of 4 to 8 carbon atoms, alkylene of 1 to 20 carbon atoms interrupted by one to ten oxygen atoms, substituted by one to five hydroxyl groups or both interrupted by said oxygen atoms and substituted by said hydroxyl groups, in formula B and B* m is 1 or 2 when m is 1, $R_2$ is alkyl of 1 to 4 carbon atoms or $R_2$ is $CH_2(OCH_2CH_2)_nOCH_3$ where n is 1 to 12, or $R_2$ is phenyl, or said phenyl substituted by one to three methyl groups, or $R_2$ is $-NHR_3$ where $R_3$ is alkyl of 1 to 4 carbon atoms or phenyl, or said phenyl substituted by one or two methyl groups, when m is 2, R is alkylene of 1 to 8 carbon atoms, alkenylene of 4 to 8 carbon atoms, or $R_2$ is $-CH_2(OCH_2CH_2)_nOCH_2-$ where n is 1 to 12, $R_2$ is $NHR_4NH$ where $R_4$ is of 2 to 6 carbon atoms, aralkylene of 8 to 15 carbon atoms or arylene of 6 to 12 carbon atoms, or $R_2$ is $-CO-$ or $-NHCONH$, in formula C and C*, $R_{10}$ is hydrogen or, alkanoyl of 1 to 3 carbon atoms, x is 1 or 2, when x is 1, $R_{11}$, is hydrogen, alkyl of 1 to 6 carbon atoms or glycidyl, or $R_{11}$, is alkyl of 1 to 4 carbon atoms substituted by a carboxy group or by COOZ where Z is hydrogen or alkyl of 1 to 4 carbon atoms, when x is 2, $R_{11}$ is alkylene of 1 to 6 carbon atoms, in formula D and D*, $R_{10}$ is hydrogen, y is 1 or 2, $R_{12}$ is defined as $R_2$ above, in formula Y, Y*, Z and Z*, x is 1 or 2, when x is 1, $R_1$ and $R_2$ are independently alkyl of 1 to 4 carbon atoms, or $R_1$ and $R_2$ are together tetramethylene, or pentamethylene, $R_2$ is hydrogen or alkyl of 1 to 4 carbon atoms, said alkyl group substituted by a hydroxyl group, when x is 2, $R_1$ is hydrogen, alkyl of 1 to 4 carbon atoms, said alkyl substituted by a hydroxyl group, $R_2$ is alkylene of 2 to 6 carbon atoms, $R_3$ is as defined above.

More preferably the compound of component (b) is selected from the compounds of formulas A, A*, B, B*, C, C*, D, D*, Q, Q*, R and R* where E is oxyl or hydroxyl, R is hydrogen, in formula A and A*, n is 1, $R_1$ is hydrogen, alkyl of 1 to 4 carbon atoms, glycidyl, alkyl of 2 to 4 carbon atoms interrupted by one or two oxygen atoms, said alkyl substituted by one or two hydroxyl groups or both interrupted by said oxygen atoms and substituted by said hydroxyl groups, or $R_1$ is alkyl of 1 to 4 carbon atoms substituted by $-COOZ$ where Z is hydrogen or alkyl of 1 to 4 carbon atoms, in formula B and B*, m is 1 or 2, $R_2$ is alkyl of 1 to 4 carbon atoms or $R_2$ is $CH_2(OCH_2CH_2)_nOCH_3$ where n is 1 to 4, when m is 2, R is alkylene of 1 to 8 carbon atoms, in formula C and C*, $R_{10}$ is hydrogen or alkanoyl of 1 or 2 carbon atoms, x is 1 or 2, when x is 1, $R_{11}$ is hydrogen, alkyl of 1 to 4 carbon atoms or glycidyl, or $R_{11}$ is alkyl of 1 to 4 carbon atoms substituted by COOZ where Z is hydrogen or alkyl of 1 to 4 carbon atoms, when x is 2, $R_{11}$, is alkylene of 1 to 6 carbon atoms, in formula D and D*, $R_{10}$ is hydrogen, y is 1 or 2, $R_{12}$ is defined as $R_2$ above.

More particularly, the hindered amine compound is (a) bis(1-oxyl-2,2-6-6-tetramethylpiperidin-4-yl) sebacate;

(b) bis(1-hydroxy-2,2-6-6-tetramethylpiperidin-4-yl) sebacate;

(c) 1-hydroxy-2,2-6-6-tetramethyl-4-acetoxypiperidinium citrate;
(d) 1-oxyl-2,2,6,6-tetramethyl-4-acetamidopiperidine;
(e) 1-hydroxy-2,2,6,6-tetramethyl-4-acetamidopiperidine;
(f) 1-hydroxy-2,2,6,6-tetramethyl-4-acetamidopiperidinium bisulfate;
(g) 1-oxyl-2,2,6,6-tetramethyl-4-oxo-piperidine;
(h) 1-hydroxy -2,2,6,6-tetramethyl-4-oxo-piperidine;
(i) 1-hydroxy -2,2,6,6-tetramethyl-4-oxo-piperidinium acetate;
(j) 1-oxyl-2,2,6,6-tetramethyl-4-methoxy-piperidine;
(k) 1-hydroxy-2,2,6,6-tetramethyl-4-methoxy-piperidine;
(l) 1-hydroxy-2,2,6,6-tetramethyl-4-methoxy-piperidinium acetate;
(m) 1-oxyl-2,2,6,6-tetramethyl-4-acetoxypiperidine;
(n) 1-hydroxy-2,2,6,6-tetramethyl-4-acetoxypiperidine;
(o) 1-oxyl-2,2,6,6-tetramethyl-4-propoxy-piperidine;
(p) 1-hydroxy-2,2,6,6-tetramethyl-4-propoxy-piperidinium acetate;
(q) 1-hydroxy-2,2,6,6-tetramethyl-4-propoxy-piperidine;
(r) 1-oxyl-2,2,6,6-tetramethyl-4-(2-hydroxy-4-oxapentoxy)piperidine;
(s) 1-hydroxy-2,2,6,6-tetramethyl-4-(2-hydroxy-4-oxapentoxy)piperidinium acetate;
(t) 1-oxyl-2,2,6,6-tetramethyl-4-hydroxypiperidine;
(u) 1-hydroxy-2,2,6,6-tetramethyl-4-hydroxypiperidine;
(v) 1-hydroxy-2,2,6,6-tetramethyl-4-hydroxypiperidinium chloride;
(w) 1-hydroxy-2,2,6,6-tetramethyl-4-hydroxypiperidinium acetate;
(x) 1-hydroxy-2,2,6,6-tetramethyl-4-hydroxypiperidinium bisulfate;
(y) 1-hydroxy-2,2,6,6-tetramethyl-4-hydroxypiperidinium citrate;
(z) bis(1-hydroxy-2,2,6,6-tetramethyl-4-hydroxypiperidinium) citrate;
(aa) tris(1-hydroxy-2,2,6,6-tetramethyl-4-hydroxypiperidinium) citrate;
(bb) tetra(1-hydroxy-2,2,6,6-tetramethyl-4-hydroxypiperidinium) ethylenediaminetetraacetate;
(cc) tetra(1-hydroxy-2,2,6,6-tetramethyl-4-acetamidopiperidinium) ethylenediaminetetraacetate;
(dd) tetra(1-hydroxy-2,2,6,6-tetramethyl-4-oxopiperidinium) ethylenediaminetetraacetate;
(ee) penta(1-hydroxy-2,2,6,6-tetramethyl-4-hydroxypiperidinium) diethylenetriaminepentaacetate;
(ff) penta(1-hydroxy-2,2,6,6-tetramethyl-4-acetamidopiperidinium) diethylenetriaminepentaacetate;
(gg) penta(1-hydroxy-2,2,6,6-tetramethyl-4-oxopiperidinium) diethylenetriaminepentaacetate;
(hh) tri(1-hydroxy-2,2,6,6-tetramethyl-4-hydroxypiperidinium) nitrilotriacetate;
(ii) tri(1-hydroxy-2,2,6,6-tetramethyl-4-acetamidopiperidinium) nitrilotriacetate;
(jj) tri(1-hydroxy-2,2,6,6-tetramethyl-4-oxopiperidinium) nitrilotriacetate;
(kk) penta(1-hydroxy-2,2,6,6-tetramethyl-4-hydroxypiperidinium) diethylenetriaminepentamethylenephosphonate;
(ll) penta(1-hydroxy-2,2,6,6-tetramethyl-4-acetamidopiperidinium) diethylenetriaminepentamethylenephosphonate;
(mm) penta(1-hydroxy-2,2,6,6-tetramethyl-4-oxopiperidinium) diethylenetriaminepentamethylenephosphonate.

Most especially, the hindered amine compound is
(a) 1-oxyl-2,2,6,6-tetramethyl-4-hydroxypiperidine;
(b) 1-hydroxy-2,2,6,6-tetramethyl-4-hydroxypiperidine;
(c) 1-hydroxy-2,2,6,6-tetramethyl-4-hydroxypiperidinium chloride;
(d) 1-hydroxy-2,2,6,6-tetramethyl-4-hydroxypiperidinium acetate;
(e) 1-hydroxy-2,2,6,6-tetramethyl-4-hydroxypiperidinium bisulfate;
(f) 1-hydroxy-2,2,6,6-tetramethyl-4-hydroxypiperidinium citrate;
(g) bis(1-hydroxy-2,2,6,6-tetramethyl-4-hydroxypiperidinium) citrate;
(h) tris(1-hydroxy-2,2,6,6-tetramethyl-4-hydroxypiperidinium) citrate;
(i) tetra(1-hydroxy-2,2,6,6-tetramethyl-4-hydroxypiperidinium) ethylenediaminetetraacetate;
(j) tetra(1-hydroxy-2,2,6,6-tetramethyl-4-acetamidopiperidinium) ethylenediaminetetraacetate;
(k) tetra(1-hydroxy-2,2,6,6-tetramethyl-4-oxopiperidinium) ethylenediaminetetraacetate;
(l) penta(1-hydroxy-2,2,6,6-tetramethyl-4-hydroxypiperidinium) diethylenetriaminepentaacetate;
(m) penta(1-hydroxy-2,2,6,6-tetramethyl-4-acetamidopiperidinium) diethylenetriaminepentaacetate;
(n) penta(1-hydroxy-2,2,6,6-tetramethyl-4-oxopiperidinium) diethylenetriaminepentaacetate.

Preferred is a method wherein the stain or impregnation contains additionally a polymeric binder material.

The hindered amine compound b) is preferably present in an amount of 0.1–10%, more prefered 0.2–5% and most prefered 0.2–2% by weight based on the weight of components a) (solvent) and c) (binder).

The hindered amine compounds are known and partially commercially available or may be produced by chemical standard methods. Examples are given in J. Polym Sci. Polym. Chem. Ed., 22, 277–281 (1984) and in U.S. Pat. No. 4,831,134. The salts are readiliy prepared from the corresponding amine precursor and a suitable acid.

The intermediates needed to make the instant compounds are largely items of commerce.

Preferably the solvent is selected from the group consisting of aliphatic hydrocarbons, cycloaliphatic hydrocarbons, aromatic hydrocarbons, alcohols, ethers, esters, ketones, glycols, glycol ethers, glycol esters, polyglycols or mixtures thereof.

The stain or impregnation shall penetrate the surface of the wood, and should therefore be of relatively low viscosity. In the simplest case, the impregnation is a solution of the hindered amine in an organic solvent. Exemplary of useful solvents for the purpose are aliphatic hydrocarbons such as specific petroleum fractions. Further suitable solvents are aromatic hydrocarbons such as toluene or xylene; alcohols such as methanol, ethanol, isopropanol or butanol; esters such as ethyl acetate or butyl acetate; or ketones such as acetone, methyl ethyl ketone or methyl isobutyl ketone. These solvents evaporate at room temperature and therefore do not remain in the wood. It is, however, also possible to add high boiling liquids which remain in the wood, for example higher alkanols, glycols, glycol ethers, glycol esters or polyglycols. The stain or impregnation may also contain a binder conventionally used for protective wood coatings.

Preferably the binder is selected from the group consisting of alkyd resins, modified alkyd resins, autocrosslinking or non-autocrosslinking acrylic resins, polyester resins, drying oils, phenolic resins, nitrocellulose or mixtures thereof.

In a further preferred embodiment of the present invention an additional stabilizer selected from the group consisting of a sterically hindered phenol, a phosphite or phosphonite or mixtures thereof is used.

Examples of sterically hindered phenols, useful as antioxidants are given below.

1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(a-methylcyclohexyl)-4,6-dimethylphenol, 2,6-dioctadecyl-4-methylphenol, 2,4,6-tri cyclohexylphenol, 2,6-di-tert-butyl-4-methoxymethylphenol, 2,6-di-nonyl-4-methyl-phenol.
2. Alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxy phenol.
3. Hydroxylated thiodiphenyl ethers, for example 2,2'-thiobis(6-tert-butyl-4-methyl phenol), 2,2'-thiobis(4-octylphenol), 4,4'-thiobis(6-tert-butyl-3-methylphenol), 4,4'-thiobis(6-tert-butyl-2-methylphenol).
4. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(a-methyl cyclohexyl)phenol], 2,2'-methylenebis(4-methyl-6-cyclohexylphenol), 2,2'-methylene bis(6-nonyl-4-methylphenol), 2,2'-methylenebis(4,6-di-tert-butylphenol), 2,2'-ethylidene bis(4,6-di-tert-butylphenol), 2,2'-ethylidenebis(6-tert-butyl-4-isobutylphenol), 2,2'-methylenebis[6-(a-methylbenzyl)-4-nonylphenol], 2,2'-methylenebis[6-(a,a-dimethyl benzyl)-4-nonylphenol], 4,4'-methylenebis(2,6-di-tert-butylphenol), 4,4'-methylene bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxy phenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4methylphenyl] terephthalate.
5. Benzyl compounds, for example 1,3,5-tris(3,5-di-tert-butyl-4-hydroxybenzyl)-2,4,6-trimethylbenzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6-dimethylbenzyl) dithiolterephthalate, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, dioctadecyl 3,5-di-tert-butyl-4-hydroxybenzylphosphonate, calcium salt of monoethyl 3,5-di-tert-butyl-4-hydroxybenzylphosphonate, 1,3,5-tris(3,5-dicyclohexyl-4-hydroxybenzyl)isocyanurate.
6. Acylaminophenols, for example 4-hydroxylauranilide, 4-hydroxystearanilide, 2,4-bis(octylmercapto)-6-(3,5-di-tert-butyl-4-hydroxyanilino)-s-triazine, octyl N-(3,5-di-tert-butyl-4-hydroxyphenyl)carbamate.
7. Esters of β-(3,5-di-tert-butyl-4-hydroxyphenyl)propionic acid with mono- or polyhydric alcohols, e.g. with methanol, octadecanol, 1,6-hexanediol, neopentyl glycol, triethylene glycol, pentaerythritol, tris(hydroxyethyl) isocyanurate, thiodiethylene glycol, N,N'-bis (hydroxyethyl)oxalodiamide.
8. Esters of β-(5-tert-butyl-4-hydroxy-3-methylphenyl) propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalodiamide.
9. Esters of β-(3,5-dicyclohexyl-4-hvdroxyphenyl)propionic acid with mono- or poly hydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalodiamide.
10. Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

In specific cases it may be advantageous to use two or more antioxidants.

Examples of useful phosphites, or phosphonites are: triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 2,2',2"-nitrilo[triethyltris(3,3',5,5'-tetra-tert-butyl-1,1'-biphenyl-2,2'-diyl)phosphite], 2-ethylhexyl(3,3', 5,5'-tetra-tert-butyl-1,1'-biphenyl-2,2'-diyl)phosphite.

Especially preferred are the following phosphites:

Tris(2,4-di-tert-butylphenyl) phosphite (Irgafos® 168, Ciba-Geigy), tris(nonylphenyl) phosphite,

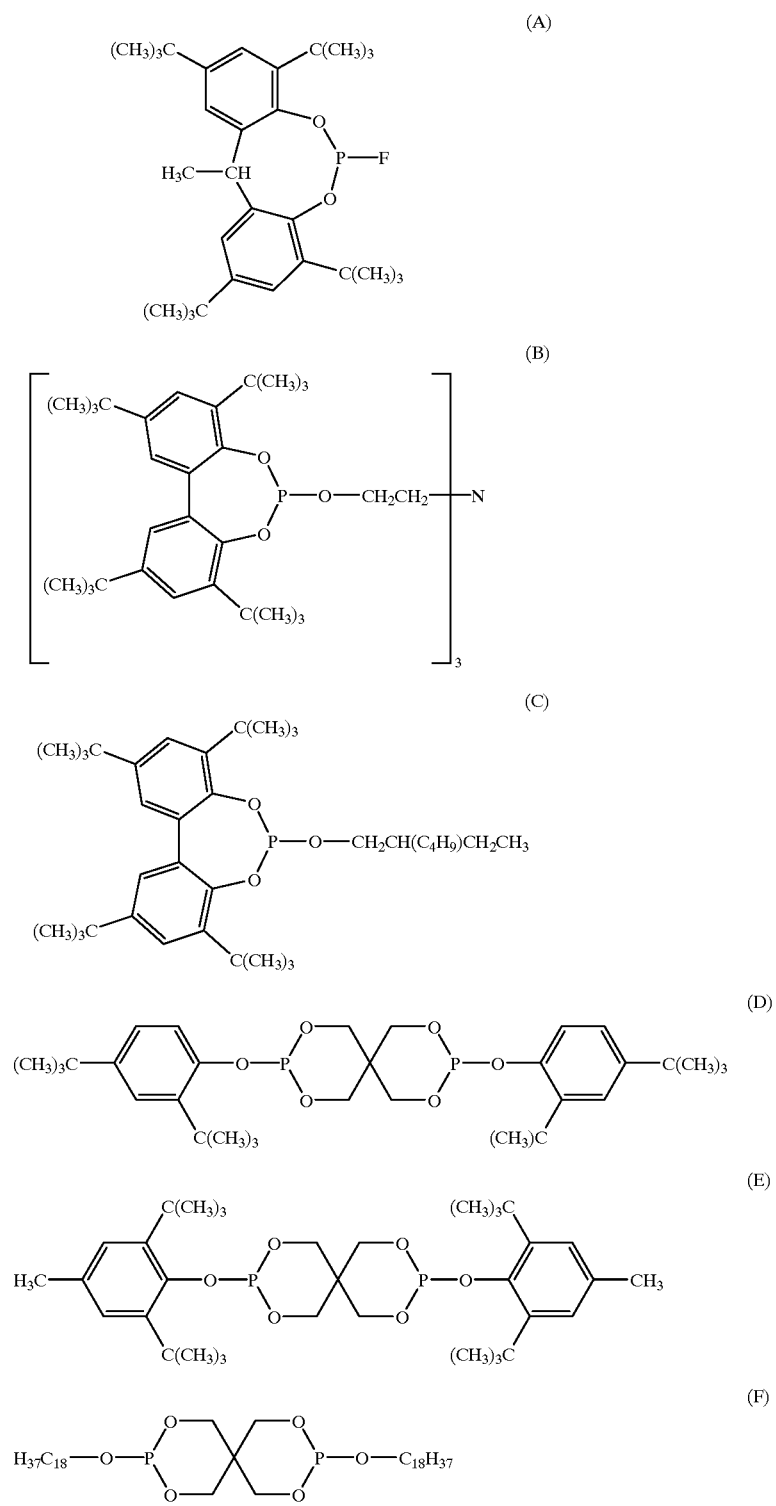

(G)

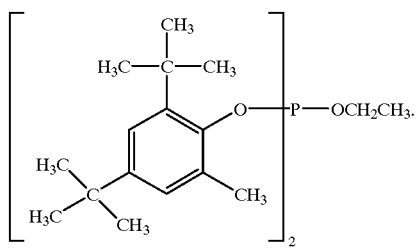

The sterically hindered phenols, phosphites or phosphonites are preferably present in an amount of 0.01%–5% by weight based on the total formulation.

The stain or impregnation may also contain preservatives such as fungicides or insecticides. Exemplary of useful fungicides are tributyltin oxide, phenylmercury salts, copper naphthenate, 1-chloronaphthalene or pentachlorophenol. Exemplary of useful insecticides are DDT, dieldrin, lindane, azaconazol, cypermethin, benzalkoniumhydrochloride, propiconazol or parathion.

Further ingredients which may be present in the stain or impregnation are minor amounts of accelerators (hardeners) for the binders, dyes or pigments, penetration aids and surface active ingredients.

The stain or impregnation can be applied to the wood by conventional techniques, for example by impregnating, spreading, brushing, dipping, deluging or spraying. Also impregnating under high pressure or under vacuum is possible. The stain or impregnation may also be an aqueous coating. Instead of the organic solvent, the vehicle may then consist of water or a mixture of water and a water-soluble organic solvent. The sterically hindered amine compound b) and the other components may be dissolved or dispersed in this vehicle.

A preferred binder is an emulsion of alkyd resins or acrylic resins or a mixture of both.

In one preferred embodiment of the present invention an additional top coat is applied to the wood.

Any coating composition suitable for coating wood may be used as additional top coat. It will normally contain a binder, dissolved or dispersed in an organic solvent or in water or a mixture of water and solvent. The binder may typically be a surface coating resin which dries in the air or hardens at room temperature. Exemplary of such binders are nitrocellulose, polyvinyl acetate, polyvinyl chloride, unsaturated polyester resins, polyacrylates, polyurethanes, epoxy resins, phenolic resins, and especially alkyd resins. The binder may also be a mixture of different surface coating resins. Provided the binders are curable binders, they are normally used together with the hardener and/or accelerator.

Typical examples of organic solvents which may suitably be used for the coating compositions are aliphatic, aromatic or cycloaliphatic hydrocarbons, alcohols, esters, ketones or chlorinated hydrocarbons.

Water/solvent mixtures are typically mixtures of water and lower alcohols, glycols or glycol ethers.

The top coat may also be a radiation-curable, solvent-free formulation of photopolymerisable compounds. Illustrative examples are mixtures of acrylates or methacrylates, unsaturated polyester/styrene mixtures or mixtures of other ethylenically unsaturated monomers or oligomers.

The top coat may contain a soluble dye and/or a pigment and/or a filler. The pigment may be an organic, inorganic or metallic pigment. The pigments may be opaque or transparent such as for example transparent iron oxides. The filler may be typically kaolin, calcium carbonate or aluminium silicate. Preferably the top coat is a clear varnish, i.e. it contains no undissolved components.

Although the stain or impregnation contains the sterically hindered amine of formula (I) and affords good protection against light, it may be advantageous to add the sterically hindered amine of formula (I) and/or other conventional light stabilizers to the top coat. Illustrative examples of suitable conventional light stabilizers are the following compounds:

UV Absorbers and Light Stabilisers 2-(2'-Hydroxyphenyl)benzotriazoles, for example 2-(2'-hydroxy-5'-methylphenyl)-benzo-triazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(a,a-dimethylbenzyl)-2'-hydroxyphenyl)benzotriazole, 2-(3'-tert-butyl-2'-hydroxy-5-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxy-carbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis-[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$-]$_2$ where R=3'-tert-butyl-4'-hydroxy-5'-2H-benzotriazol-2-ylphenyl, 2-[2'-hydroxy-3'-(a,a-dimethylbenzyl)-5'-(1,1,3,3-tetramethylbutyl)-phenyl]benzotriazole; 2-[2'-hydroxy-3'-(1,1,3,3-tetramethylbutyl)-5'-(a,a-dimethylbenzyl)-phenyl] benzotriazole.

2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Esters of substituted and unsubstituted benzoic acids, as for example 4-tertbutyl-phenyl salicylate, phenyl salicylate, octylphenyl salicylate, dibenzoyl resorcinol, bis(4-tertbutylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

Acrylates, for example ethyl a-cyano-b,b-diphenylacrylate, isooctyl a-cyano-b,b-diphenylacrylate, methyl a-carbomethoxycinnamate, methyl a-cyano-b-methyl-p-methoxy-cinnamate, butyl a-cyano-b-methyl-p-methoxy-cinnamate, methyl a-carbomethoxy-p-methoxycinnamate and N-(b-carbomethoxy-b-cyanovinyl)-2-methylindoline.

Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis (2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro [4,5]decane, a reaction product of 7,7,9,9-tetramethyl-2-cycloundecyl-1-oxa-3,8-diaza-4-oxospiro [4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-a-olefin-copolymer with 2,2,6,6-tetramethyl-4-aminopiperidine or 1,2,2,6,6-pentamethyl-4-aminopiperidine.

Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanlide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2-(2-Hydroxyphenyl)-1,3,5-triazines, for example 2,4,6-tris (2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis-(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy) phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

A further subject of the present invention is the use of a hindered amine compound of formula I or II

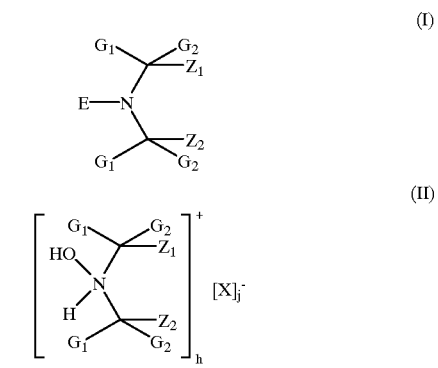

where
- $G_1$ and $G_2$ are independently alkyl of 1 to 4 carbon atoms or are together pentamethylene,
- $Z_1$ and $Z_2$ are each methyl, or $Z_1$ and $Z_2$ together form a linking moiety which may additionally be substituted by an ester, ether, hydroxy, oxo, cyanohydrin, amide, amino, carboxy or urethane group, E is oxyl or hydroxyl, X is an inorganic or organic anion, and where the total charge of cations h is equal to the total charge of anions j.

Examples and preferences for the substituents have been already mentioned and apply also for the above subjects of the invention.

The present invention is particularly useful for the following applications:

in house applications, such as furniture, parquet floors, chipboards or timber work;

outdoor applications such as fences, construction parts, wooden fronts, window frames and the like.

In cases where maximum stabilization is required a complete wood protection system may be applied. The wood protection system comprises an impregnation according to the present invention, optionally an intermediate layer and a final top coat, which may be stabilized as described before.

The following examples illustrate the invention.

EXAMPLE 1 a) Impregnation:

To a commercially available impregnation ("Xylamon® Incolore" solids content of 5,2% from Sepam) 0,5% based on total formulation of the additives given in table 1 are added.

Comparative formulation: 0,5% Tinuvin® 292 (hindered amine light stabilizer from Ciba Specialty Chemicals) on total formulation.

The impregnation is applied by brush (1 application) to fir panels and dried for 24 hours at room temperature.

b) Top Coat:

A top coat is prepared from:

53,48 parts of an Alkyd Resin (Jägalyd Antihydro®, E. Jäger KG, 60% solution in white spirit)

10,69 parts of a thixotropic agent (Jägalyd Antihydro-Thix®, E. Jäger KG, 50% solution)

1,92 parts of an accelerator (Jäger Antihydro-Trockner®)

33,44 parts of a solvent (Terlitol® 30)

0,32 parts of an antiskinning agent (Ascinin® P, BAYER)

0,15 parts of an antiskinning agent (Luactin® M, BASF)

The top coat is stabilized with 1.5% Tinuvin® 384 (UV-Absorber from Ciba Specialty Chemicals) and 1% Tinuvin® 123 (hindered amine light stabilizer from Ciba Specialty Chemicals). Concentrations are based on binder solids.

The topcoat is applied by brush (3 applications) on the impregnated fir panels and dried for 24 hours at room temperature after each application.

The panels are exposed to accelerated weathering: Xenon-Weatherometer (CAM 7 cycle: 102 minutes light at 60° C., 18 minutes light with rain at 40° C.).

Colour change DE was measured according to DIN 6174 after weathering. An unexposed fir panel with unstabilized impregnation and unstabilized top coat is used as reference.

The results are presented in Table 1.

TABLE 1

| Colour Change after 800 hours of Exposure | | |
|---|---|---|
| Additive in the Impregnation (% based on total formulation) | Additive in the Top Coat (% based on binder solids) | DE |
| unstabilized | unstabilized | 18.2 |
| unstabilized | 1.5% Tinuvin 384 + 1% Tinuvin 123 | 9.8 |
| 0.5% Tinuvin 292 (comparative) | 1.5% Tinuvin 384 + 1% Tinuvin 123 | 8.6 |
| 0.5% compound (101) | 1.5% Tinuvin 384 + 1% Tinuvin 123 | 7.7 |
| 0.5% compound (102) | 1.5% Tinuvin 384 + 1% Tinuvin 123 | 6.5 |
| 0.5% compound (104) | 1.5% Tinuvin 384 + 1% Tinuvin 123 | 8.0 |

EXAMPLE 2 a) Impregnation:

To a waterborne Impregnation (main binder component: waterborne acrylic dispersion) with a solids content of 15%, 1% of the additives given in Table 2 are added.

Comparative formulation: 0,5% Tinuvin® 292 (hindered amine light stabilizer from Ciba Specialty Chemicals) on total formulation.

The impregnation is applied by brush (1 application) to fir panels and dried for 24 hours at room temperature.

b) Top Coat:

The waterborne top coat (main binder component: waterborne acrylic dispersion) with a solids content of 39% was stabilized with 2% Tinuvin® 1130 (UV-Absorber from Ciba Specialty Chemicals) and 1% Tinuvin® 292 (hindered amine light stabilizer from Ciba Specialty Chemicals). Concentrations are based on binder solids.

The topcoat is applied by brush (2 applications) on the impregnated fir panels and dried for 24 hours at room temperature after each application.

c) Without Topcoat

In a second series the impregnated wood panels are subjected to accelerated weathering without topcoat.

The panels with topcoat are exposed to accelerated weathering: QUV (UVA-340: 5 hours light at 58° C., 1 hour spray without light at 22° C.).

Colour change DE is measured according to DIN 6174 after weathering. As reference an unexposed fir panel with unstabilized impregnation and unstabilized top coat is used. The results are presented in Table 2.

The impregnated panels without topcoat are exposed to accelerated weathering under following conditions: UVA-340 bulb: continuous irradiation at room temperature without additional humidity.

Colour change DE is measured according to DIN 6174 after weathering. As reference an unexposed fir panel with unstabilized impregnation is used. The results are presented in Table 3.

TABLE 2

| Colour Change after 800 hours of Exposure | | |
|---|---|---|
| Additive in the Impregnation (based on total formulation) | Additive in the Top Coat (based on binder solids) | DE |
| unstabilized | unstabilized | 22.2 |
| unstabilized | 2% Tinuvin 1130 + 1% Tinuvin 292 | 8.8 |
| 1% Tinuvin 292 | 2% Tinuvin 1130 + 1% Tinuvin 292 | 8.3 |

TABLE 2-continued

Colour Change after 800 hours of Exposure

| Additive in the Impregnation (based on total formulation) | Additive in the Top Coat (based on binder solids) | DE |
|---|---|---|
| (comparative) | | |
| 1% compound (101) | 2% Tinuvin 1130 + 1% Tinuvin 292 | 3.7 |
| 1% compound (102) | 2% Tinuvin 1130 + 1% Tinuvin 292 | 5.6 |

TABLE 3

Colour Change after 96 hours of Exposure

| Additive in the Impregnation (based on total formulation) | Additive in the Top Coat (based on binder solids) | DE |
|---|---|---|
| unstabilized | no top coat | 16.7 |
| 1% Tinuvin 292 (comparative) | no top coat | 16.3 |
| 1% compound (101) | no top coat | 13.0 |
| 1% compound (102) | no top coat | 15.5 |

EXAMPLE 3 a) Impregnation:

The same impregnation is used as described in Example 2.

b) Top Coat:

The waterborne top coat (main binder component: waterborne acrylic dispersion) with a solids content of 41% is stabilized with 2% Tinuvin® 1130 (UV-Absorber from Ciba Specialty Chemicals) and 1% Tinuvin® 292 (hindered amine light stabilizer from Ciba Specialty Chemicals). Concentrations are based on binder solids. The additives were predissolved in butylglycole.

The impregnation is applied by brush (1 application) to fir panels and dried for 24 hours at room temperature.

The topcoat is applied by brush (2 applications) on the impregnated fir panels and dried for 24 hours at room temperature after each application.

The panels are exposed to accelerated weathering: QUV (UVA-340: 5 hours light at 58° C., 1 hour spray without light at 22° C.).

Yellowing was measured according to ASTM D 1925. The results are shown as difference of the Yellowness Index DYI before and after weathering (same panel). The results are presented in Table 4.

TABLE 4

Yellowing after 400 hours of Exposure

| Additive in the Impregnation (based on total formulation) | Additive in the Top Coat (based on binder solids) | DYI |
|---|---|---|
| no impregnation | unstabilized | 31.0 |
| unstabilized | 2% Tinuvin 1130 + 1% Tinuvin 292 | 21.7 |
| 1% Tinuvin 292 (comparative) | 2% Tinuvin 1130 + 1% Tinuvin 292 | 19.0 |
| 1% compound (103) | 2% Tinuvin 1130 + 1% Tinuvin 292 | 7.1 |

EXAMPLE 4

Example 1 is repeated with compound 105 and the same weathering conditions are applied.

The control panel without stabilizer shows an initial Yellowness Index Y of 53.1 and the sample with compound (105) of 51.9.

The compound of formula (105) is well incorporated in the impregnation.

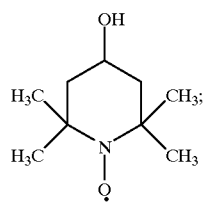

Compound (101)

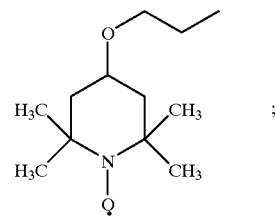

compound (102)

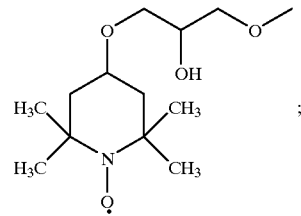

compound (103)

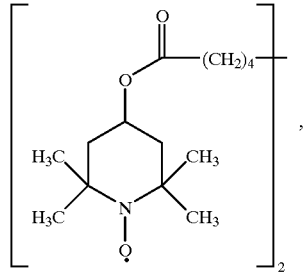

compound (104)

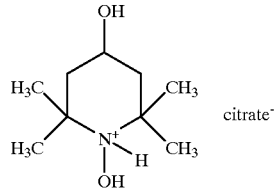

(105)

Tinuvin® 1130 and Tinuvin® 384 are commercial benzotriazol UV-absorber of Ciba Specialty Chemicals Inc.

Tinuvin® 292 and Tinuvin 123 are commercial sterically hindered amines of Ciba Specialty Chemicals Inc.

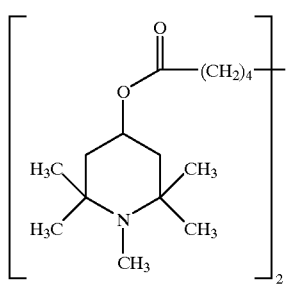

Tinuvin 292

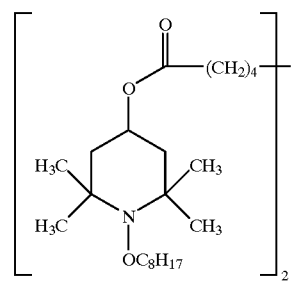

Tinuvin 123

What is claimed is:

1. A method of protecting wood against light-induced degradation by treatment with a stain or impregnation which penetrates the surface of the wood comprising
   a) at least one organic solvent, and
   b) a hindered amine compound which is
      (a) bis(1-oxyl-2,2-6-6-tetramethylpiperidin-4-yl) sebacate;
      (b) bis(1-hydroxy-2,2-6-6-tetramethylpiperidin-4-yl) sebacate;
      (c) 1-hydroxy-2,2-6-6-tetramethyl-4-acetoxypiperidinium citrate;
      (d) 1-oxyl-2,2,6,6-tetramethyl-4-acetamidopiperidine;
      (e) 1-hydroxy-2,2,6,6-tetramethyl-4-acetamidopiperidine;
      (f) 1-hydroxy-2,2,6,6-tetramethyl-4-acetamidopiperidinium bisulfate;
      (g) 1-oxyl-2,2,6,6-tetramethyl-4-oxo-piperidine;
      (h) 1-hydroxy -2,2,6,6-tetramethyl-4-oxo-piperidine;
      (i) 1-hydroxy -2,2,6,6-tetramethyl-4-oxo-piperidinium acetate;
      (j) 1-oxyl-2,2,6,6-tetramethyl-4-methoxy-piperidine;
      (k) 1-hydroxy-2,2,6,6-tetramethyl-4-methoxy-piperidine;
      (l) 1-hydroxyl-2,2,6,6-tetramethyl-4-methoxy-piperidinium acetate;
      (m) 1-oxyl-2,2,6,6-tetramethyl-4-acetoxypiperidine;
      (n) 1-hydroxy-2,2,6,6-tetramethyl-4-acetoxypiperidine;
      (o) 1-oxyl-2,2,6,6-tetramethyl-4-propoxy-piperidine;
      (p) 1-hydroxy-2,2,6,6-tetramethyl-4-propoxy-piperidinium acetate;
      (q) 1-hydroxy-2,2,6,6-tetramethyl-4-propoxy-piperidine;
      (r) 1-oxyl-2,2,6,6-tetramethyl-4-(2-hydroxy-4-oxapentoxy)piperidine;
      (s) 1-hydroxy-2,2,6,6-tetramethyl-4-(2-hydroxy-4-oxapentoxy)piperidinium acetate;
      (t) 1-oxyl-2,2,6,6-tetramethyl-4-hydroxypiperidine;
      (u) 1-hydroxy-2,2,6,6-tetramethyl-4-hydroxypiperidine;
      (v) 1-hydroxy-2,2,6,6-tetramethyl-4-hydroxypiperidinium chloride;
      (w) 1-hydroxy-2,2,6,6-tetramethyl-4-hydroxypiperidinium acetate;
      (x) 1-hydroxy-2,2,6,6-tetramethyl-4-hydroxypiperidinium bisulfate;
      (y) 1-hydroxy-2,2,6,6-tetramethyl-4-hydroxypiperidinium citrate;
      (z) bis(1-hydroxy-2,2,6,6-tetramethyl-4-hydroxypiperidinium) citrate;
      (aa) tris(1-hydroxy-2,2,6,6-tetramethyl-4-hydroxypiperidinium) citrate;
      (bb) tetra(1-hydroxy-2,2,6,6-tetramethyl-4-hydroxypiperidinium) ethylenediaminetetraacetate;
      (cc) tetra(1-hydroxy-2,2,6,6-tetramethyl-4-acetamidopiperidinium) ethylenediaminetetraacetate;
      (dd) tetra(1-hydroxy-2,2,6,6-tetramethyl-4-oxopiperidinium) ethylenediaminetetraacetate;
      (ee) penta(1-hydroxy-2,2,6,6-tetramethyl-4-hydroxypiperidinium) diethylenetriaminepentaacetate;
      (ff) penta(1-hydroxy-2,2,6,6-tetramethyl-4-acetamidopiperidinium) diethylenetriaminepentaacetate;
      (gg) penta(1-hydroxy-2,2,6,6-tetramethyl-4-oxopiperidinium) diethylenetriaminepentaacetate;
      (hh) tri(1-hydroxy-2,2,6,6-tetramethyl-4-hydroxypiperidinium) nitrilotriacetate;
      (ii) tri(1-hydroxy-2,2,6,6-tetramethyl-4-acetamidopiperidinium) nitrilotriacetate;
      jj) tri(1-hydroxy-2,2,6,6-tetramethyl-4-oxopiperidinium) nitrilotriacetate;
      (kk) penta(1-hydroxy-2,2,6,6-tetramethyl-4-hydroxypiperidinium) diethylenetriaminepentamethylenephosphonate;
      (ll) penta(1-hydroxy-2,2,6,6-tetramethyl-4-acetamidopiperidinium) diethylenetriaminepentamethylenephosphonate; or
      (mm) penta(1-hydroxy-2,2,6,6-tetramethyl-4-oxopiperidinium) diethylenetriaminepentamethylenephosphonate.

2. A method according to claim 1 wherein the stain or impregnation contains additionally a polymeric binder material.

3. A method according to claim 1 wherein the hindered amine compound b) is present in an amount of 0.1–10% by weight based on the weight of component a).

4. A method according to claim 1 wherein the solvent is selected from the group consisting of aliphatic hydrocarbons, cycloaliphatic hydrocarbons, aromatic hydrocarbons, alcohols, ethers, esters, ketones, glycols, glycol ethers, glycol esters, polyglycols and mixtures thereof.

5. A method according to claim 2, wherein the binder is selected from the group consisting of alkyd resins, modified alkyd resins, autocrosslinking or non-autocrosslinking acrylic resins, polyester resins, drying oils, phenolic resins, nitrocellulose and mixtures thereof.

6. A method according to claim 1 wherein as additional stabilizer a sterically hindered phenol, a phosphite or phosphonite or mixtures thereof are used.

7. A method according to claim 1 wherein an additional top coat is applied to the wood.

* * * * *